(12) United States Patent
Weir et al.

(10) Patent No.: US 8,553,851 B2
(45) Date of Patent: Oct. 8, 2013

(54) SYSTEM AND METHOD FOR RECORDING CALLS IN AN IP-BASED COMMUNICATIONS SYSTEM

(75) Inventors: Alan Weir, Libertyville, IL (US); Randy Vyskocil, Buffalo Grove, IL (US); Bhama Rao, Lake Barrington, IL (US); Steven Greco, Round Lake, IL (US); John Blasko, Gurnee, IL (US)

(73) Assignee: NEC Sphere Communications, Inc., Linolnshire, IL (US)

( * ) Notice: Subject to any disclaimer, the term of this patent is extended or adjusted under 35 U.S.C. 154(b) by 2012 days.

(21) Appl. No.: 11/623,078

(22) Filed: Jan. 14, 2007

(65) Prior Publication Data

US 2007/0201454 A1      Aug. 30, 2007

Related U.S. Application Data

(60) Provisional application No. 60/774,000, filed on Feb. 15, 2006.

(51) Int. Cl.
  *H04M 1/64*      (2006.01)
(52) U.S. Cl.
  USPC ............. 379/70; 379/85; 379/87; 379/88.19; 379/112.01; 379/133
(58) Field of Classification Search
  None
  See application file for complete search history.

(56) References Cited

U.S. PATENT DOCUMENTS

| | | | |
|---|---|---|---|
| 5,392,329 A | 2/1995 | Adams et al. | |
| 5,923,746 A | 7/1999 | Baker et al. | |
| 6,249,570 B1 | 6/2001 | Glowny et al. | |
| 6,665,376 B1 | 12/2003 | Brown | |
| 6,728,345 B2 | 4/2004 | Glowny et al. | |
| 6,888,821 B2 | 5/2005 | Rasanen et al. | |
| 6,977,911 B1 | 12/2005 | Geen et al. | |
| 6,981,029 B1 | 12/2005 | Menditto et al. | |
| 7,068,598 B1* | 6/2006 | Bryson et al. | 370/230 |
| 2002/0133611 A1* | 9/2002 | Gorsuch et al. | 709/231 |
| 2003/0048782 A1* | 3/2003 | Rogers et al. | 370/389 |
| 2004/0120502 A1* | 6/2004 | Strathmeyer et al. | 379/265.01 |
| 2004/0148395 A1* | 7/2004 | Schulzrinne | 709/227 |
| 2005/0068897 A1* | 3/2005 | Arita et al. | 370/235 |
| 2005/0073575 A1* | 4/2005 | Thacher et al. | 348/14.13 |
| 2005/0175156 A1* | 8/2005 | Afshar et al. | 379/35 |
| 2005/0283813 A1 | 12/2005 | Jamail et al. | |
| 2006/0188080 A1* | 8/2006 | Terpstra et al. | 379/211.02 |
| 2006/0198504 A1* | 9/2006 | Shemisa et al. | 379/201.02 |
| 2006/0215822 A1* | 9/2006 | Takeshita et al. | 379/88.18 |
| 2007/0041373 A1* | 2/2007 | Lor et al. | 370/356 |
| 2008/0008302 A1* | 1/2008 | Yim | 379/112.01 |

\* cited by examiner

*Primary Examiner* — Mark Rinehart
*Assistant Examiner* — Andrew Oh
(74) *Attorney, Agent, or Firm* — Milton Gerstein; Much Shelist

(57) ABSTRACT

A software solution to recording IP based communications that is highly scalable and reliable. Recordings can be configured to occur automatically or be triggered on-demand by a user that has been given the rights to do so. The user initiating the on-demand recording need not be a participant on the call. The solution is based on two server components: a call manager and a media server. The call manager is responsible for re-routing the IP media stream between two endpoints via the media server. The media server relays the IP media packets while capturing a copy that is stored as the recording. The recordings are stored on a network share and secured using standard network file security mechanisms. Access to playback recordings requires rights that are configured via the administrator. Playback of the recordings can be accomplished via the phone, client application or web service. Each playback interface offers a listing of recordings that the user has rights to access.

6 Claims, 8 Drawing Sheets

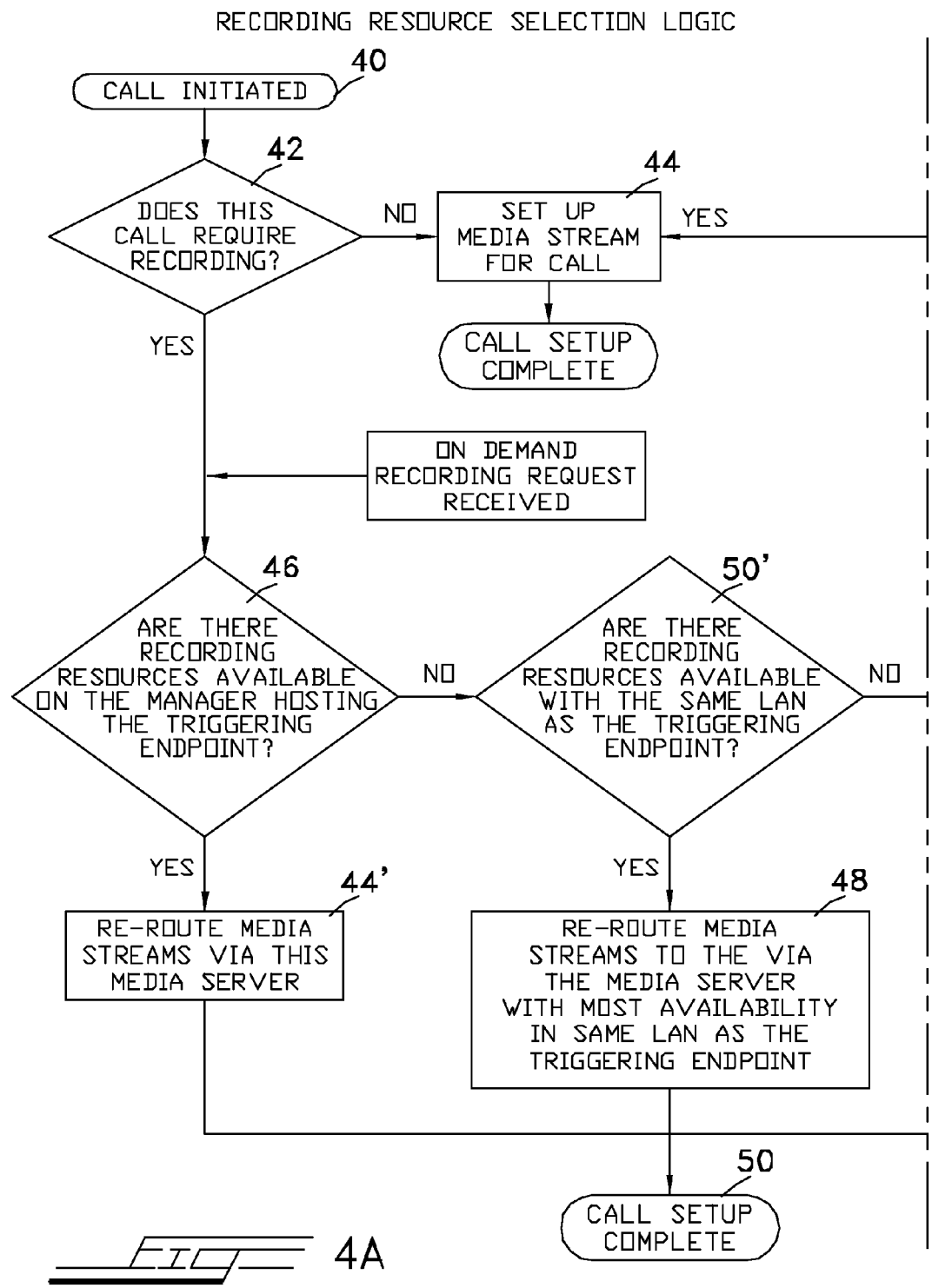

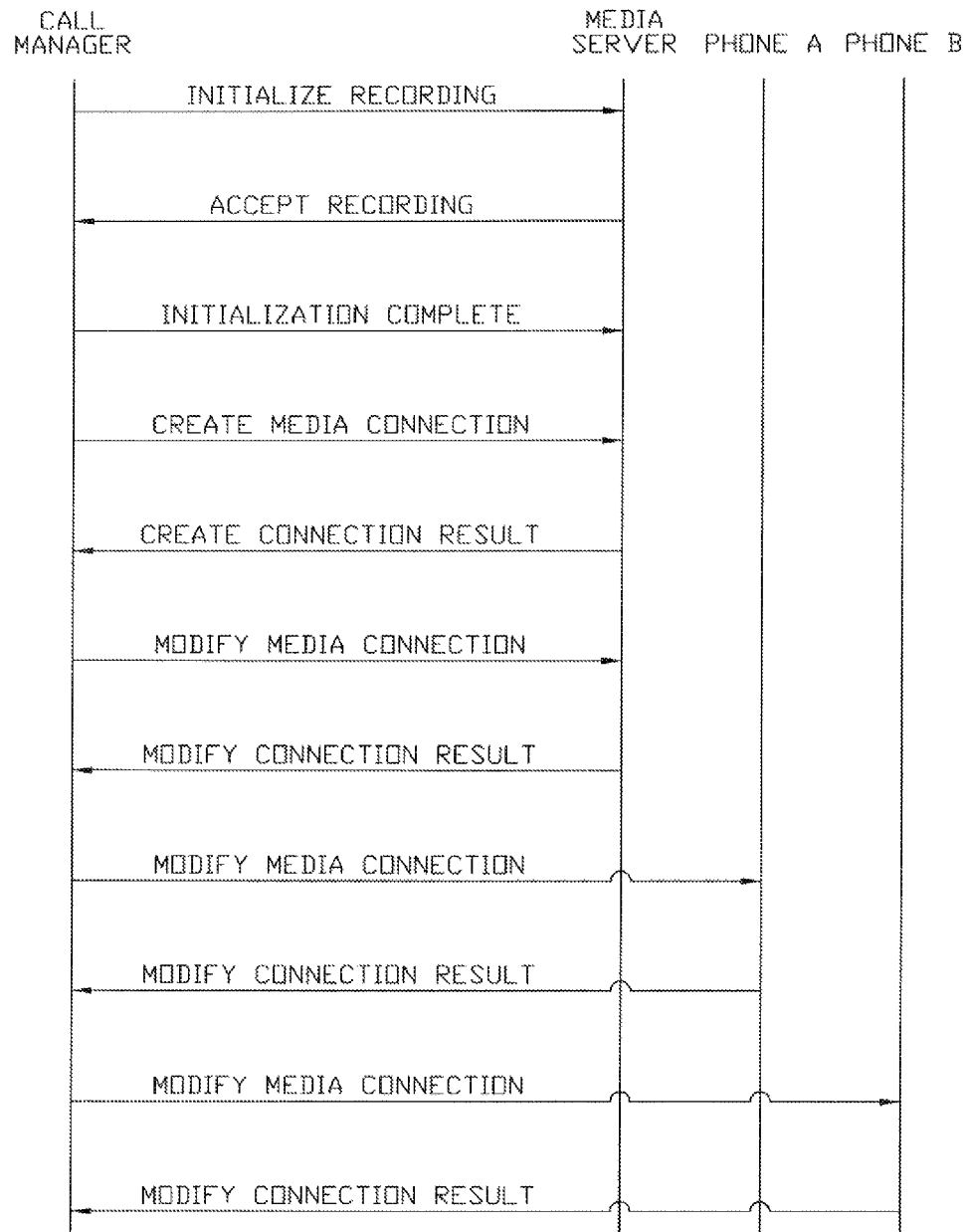

SYSTEM AND METHOD FOR RECORDING CALLS IN AN IP-BASED COMMUNICATIONS SYSTEM

CROSS REFERENCE TO RELATED APPLICATION

Priority of provisional application Ser. No. 60/774,000, filed on Feb. 15, 2006 is claimed.

BACKGROUND OF THE INVENTION

The recording of telephone calls has hithertofore been accomplished by the use of at least some hardware devices introduced into a voice circuit. Even the latest generation of packet-sniffing call-recording products requires special hardware in the form of Ethernet switches that are capable of port mirroring. Examples of prior art systems incorporating hardware for recording telephone calls are disclosed in U.S. Pat. Nos. 5,392,329; 5,923,746; 6,249,570; 6,665,376; and 6,728,345. The present invention is directed to a purely software method and system for recording telephone calls.

SUMMARY OF THE INVENTION

The present invention is directed to a purely software solution for recording telephone calls in an IP packet-based system. This software solution runs on a standard PC, and has no special hardware dedicated to it. Furthermore, the recording software of the invention may be co-located on the server providing call-control for the entire IP communications system. A benefit of this distributed software solution of the invention is that, as more recording capability is required, additional recording nodes may be added to the network of the IP communications system. Also, as the PC platform continues to increase in performance, recording capacity will correspondingly increase as well.

The distributed software architecture of the invention consists of recording resources of 1 to n processing elements or nodes. This ability to distribute the recording nodes allows recording resources to be located near the endpoints to be recorded, to thus minimize the networking resources that are required.

The software architecture of the invention ensures that the failure of any element only affects the calls in progress associated with that element. Subsequent calls for that network element are routed to other elements in the network having available capacity. The software architecture of the invention is scalable, allowing as many additional recording resources as required, with additional processing elements being added to the network as needs dictate. The software architecture of the invention is very reliable due to the nature of the packet-based system in which it is employed, while the recording resources do not need to be dedicated to a single terminal in the system. The recording resources are allocated on a call-by-call basis, therefore allowing a pool of resources to be shared over a greater number of potential terminals to be recorded. Administrators have several options on how to configure the automatic recording. By allowing the administrator to configure the system to only record calls of interest, CPU processing, bandwidth, and disk space will be saved.

The software architecture of the invention is easily and readily configurable, whereby the administration is integrated into the IP communication system itself, allowing recording configuration via the same interface from which all other communication system configurations are managed. Auto-recording is triggered using addresses. Dialing an address that has auto-record enabled will record the call and tag the recording against the dialed address. Dialing a call from a primary address that has auto-recording enabled will record the call and tag the recording against the primary address.

An example of the granularity, or packaging, of control that can be provided by the software of the present invention is demonstrated by the administration of call-recording for group addresses. A group address can be configured for auto-record in one step. When one member of a larger address group answers a call, the recording is stored against the group address and not the primary address of the station. This optimizes resources by only recording calls to the group address and not calls to and from the primary address. Another example of the administrative control offered by the software architecture of the invention is the ability to provide a selectable means of recording outbound calls. Two outside service addresses may be created for the same station or group, with one configured to record and the other not. Users then have to option of choosing the outside service that suits their need to record or not, once again providing better management of recording resources.

On-Demand recording is also provided. Recording can be initiated at any time once a call is connected. Users may stop and restart on-demand recording of a call explicitly by issuing a "stop" or "start" recording command. On-Demand recording is invoked by sending a message to the call-control application. This can be achieved by a number of means. Some examples are pressing a button on an IP telephone, using a computer-telephony integration (CTI) application or via a Web Service. The administrator can manage this privilege by assigning rights to on-demand recording via a COS (Class of Service) profile.

The software architecture of the invention provides hierarchical rights management. Recording rights may be administered at both station and user level. A station refers to a voice terminal, such as an IP telephone, while a user refers to someone that uses a terminal in the system to communicate. Users are identified by some form of credentials, such as a user name, password or a PIN code. A user is typically assigned rights to one or more voice stations or terminals. The user is then able to invoke recording for a call in progress on that terminal. The call manager applications software of the invention re-routes the IP media streams between voice terminals to be recorded through the media server.

BRIEF DESCRIPTION OF THE DRAWINGS

The invention will be more readily understood with reference to the accompanying drawings, wherein:

FIGS. 4A and 4B are a flow chart of the recording-resources selection logic of the call-recording software of the invention;

FIG. 7 is a chart showing the recording setup flow controlled by the call manager program.

DETAILED DESCRIPTION OF THE INVENTION

Figure 1:
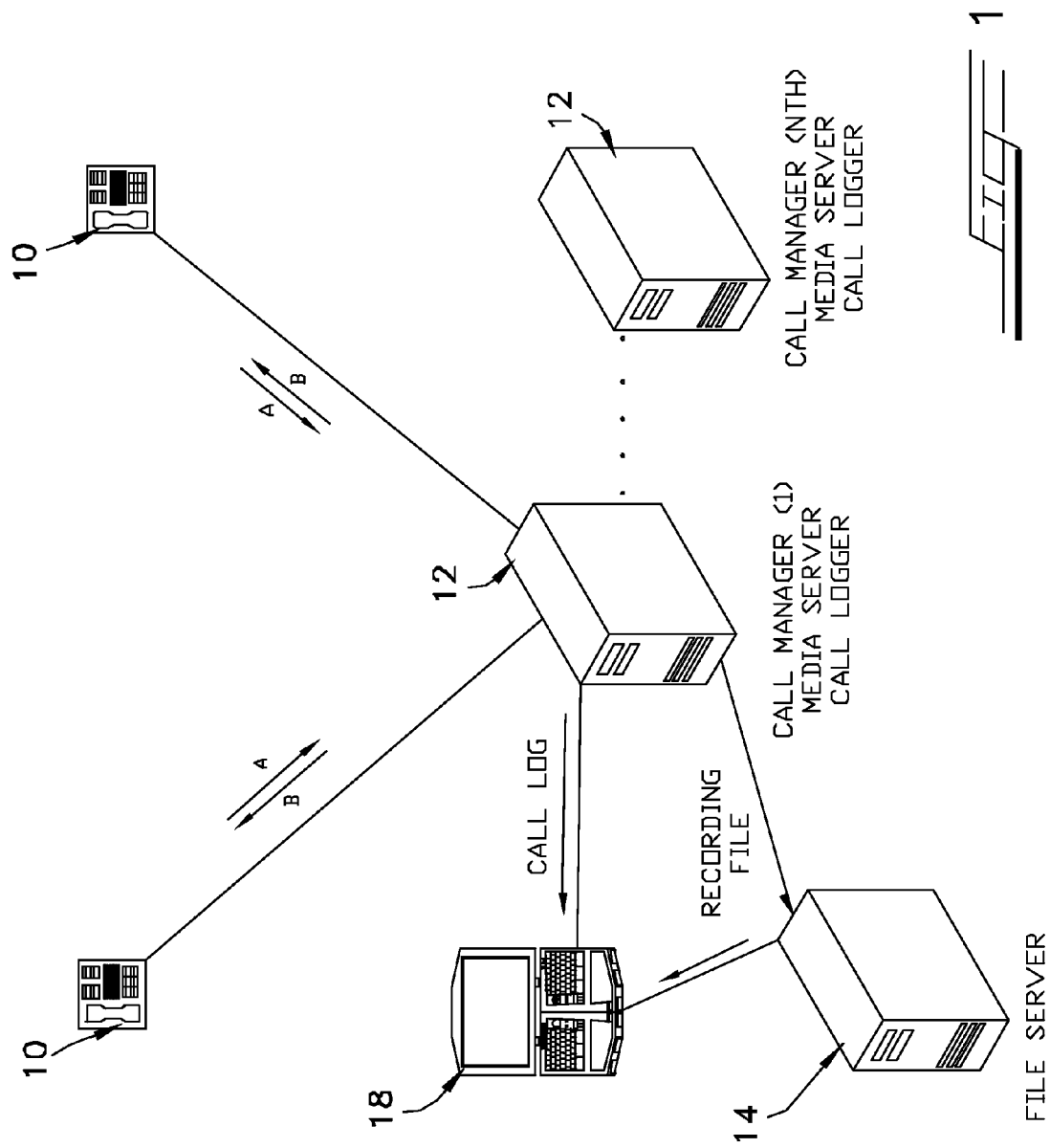
FIG. 1 is a block diagram of the system architecture of the invention.

Referring now to the drawings in greater detail, and to FIG. 1 for now, there is shown a system architecture in which the present invention is employed. The system architecture consists of a number of IP telephones 10, or the equivalents thereof, that are typically coupled to a IP network either directly or through a personal computer or workstation. The PC's and IP telephones, or end-users, form part of an IP, packet-based data network system. While each end-user 10 is typically an IP telephone, it may be a POTS-type telephone whose audio data stream has been converted to IP data format, in the well-known manner. The system architecture includes one or more media servers 12 depending upon system requirements and scale. Each server has the software applications, described in detail hereinbelow, embedded therein for achieving call-recording in accordance with the present invention, and includes all call-managing and logging. These media servers bridge end-users, whereby all audio data is streamed or routed through a respective server, so that the call-control manager of the invention may record the call and perform other functions described in detail hereinbelow. The media servers 12, in turn, are coupled to a central file server 14 where all of the recorded files that have been recorded and stored at the 1 through n media servers are downloaded for storage, for access thereto by a dedicated personal computer 18 or telephone 10.

The specific media server 12 of the 1 through n media servers 12 that is used for recording calls of a specific end user or workstation is determined using the following algorithm to optimize networking resources:

1. Media server of the call manager that is hosting the triggering end-user;
2. The lowest loaded media server on the same LAN of the triggering end-user; or
3. The lowest loaded media server on another LAN when call-admission control is disabled.

This approach provides considerable benefits for systems that span multiple geographic locations. By utilizing the optimal call manager to manage the media stream, additional optimization is capable by utilizing the call manager's knowledge of the call-state. When an end-point being recorded is put on hold, the recording paused thus not wasting resources. Another instance involves transfers. Since the call manager of the optimal media server knows every call-state, when an ongoing call of an end-point 10 being recorded is transferred, the recording is automatically split into two recording files, since the call manager is made aware of the call-transfer state. An example where this is especially useful is as follows: A PSTN call arrives to a customer-service agent end-user 10; after being unable to solve the problem, the service agent transfers the call to a supervisor at another end-point 10. Afterwards, the supervisor would like to review the call with the agent. The supervisor may easily access the leg of the call between the customer and the agent without exposing his discussion with the customer that occurred after the transfer.

Each media server 12 creates a recording of the session in a common format for easy playback. This format may be, for example, an 8 KHz, 8-bit sampled, u-law way file. Recordings are initially cached on the local or optimal processing media server 12, where they remain, or may optionally transferred to an alternative storage share or file server 14 of the data network, thus providing flexible recording storage. A phone, an internet browser or a desktop CTI (computer-telephony interface) application playback can be used to obtain credentials and access his or her recording log. The selected recording can be streamed back via RTP (Real-Time Protocol), RTSP (Real-Time Streaming Protocol) or downloaded and played back locally.

Since the storage of recordings are stored on a file-share in the data network using secure identity, prevention of any unauthorized access to the recording store is achieved, thus providing secure playback of recordings, where access to the recordings require some form of authentication. Playback may also be achieved by phone playback using a PIN code to identify the user where a recording log is displayed for selection of a recording for playback. Alternatively, web-service playback is also possible via a secure web-service using username/password credentials to obtain the recording log. The selected recording can be streamed back via RTSP (Real-Time Streaming Protocol) or downloaded and played back locally.

Figure 2:
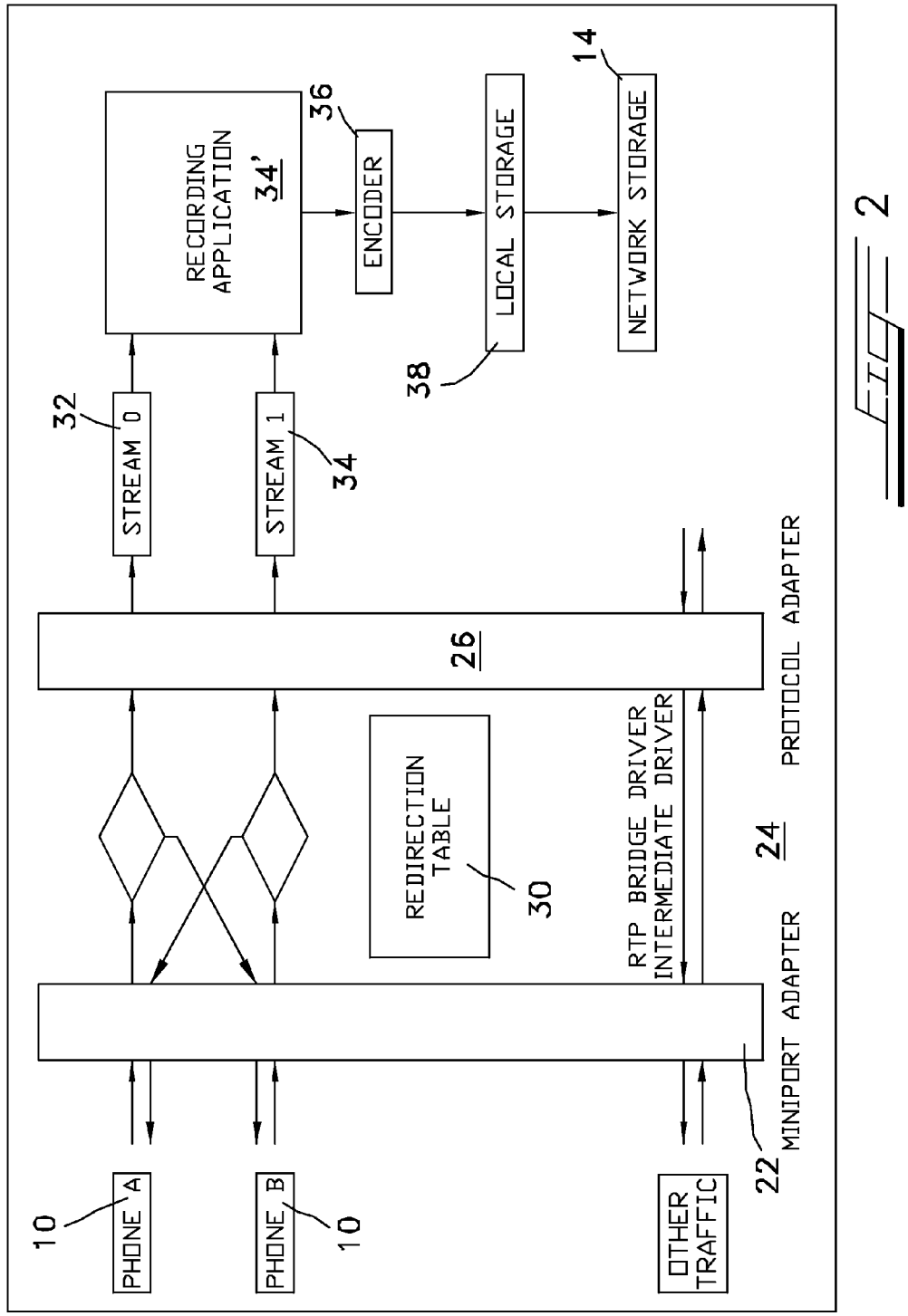
FIG. 2 is a block diagram of the media server architecture of the invention incorporating and implementing the call-recording software of the invention.
Figure 3:
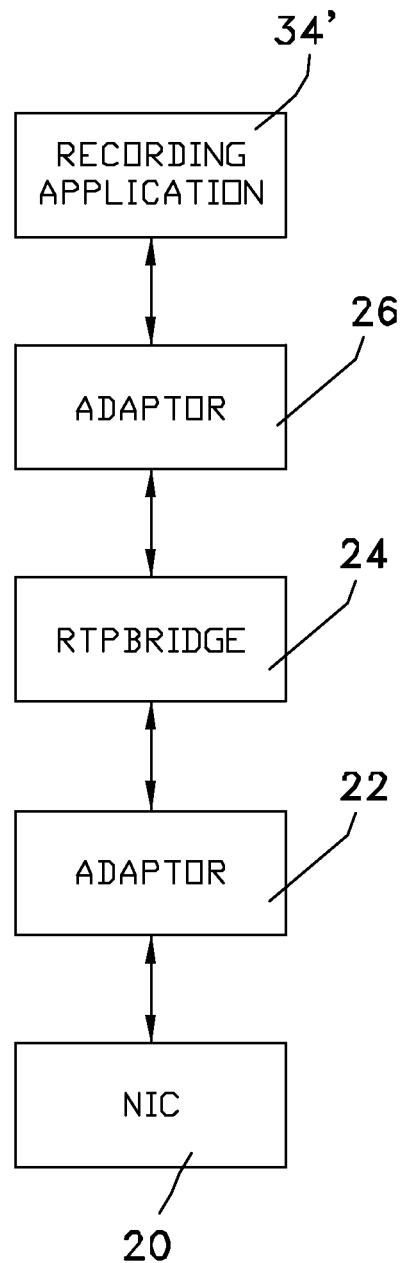
FIG. 3 is a depiction of the software layers or kernels of the media server architecture of FIG. 2.

Referring now to FIGS. 2 and 3, there is shown the main software architecture of the invention at each media server 12. Audio data stream from IP phones 10, or their equivalents, are conventionally connected to the network via a network interface card (NIC) 20, one phone being the source providing an audio stream 0 and the second being the destination providing an audio stream 1. The NIC acts as a gateway through which audio data frames are transmitted and received at the media server. The NIC is controlled by a conventional network driver interface or miniport adapter or driver 22 by which one or more NIC drivers send and receive data packets and communicate with the one or more overlying protocol drivers and the operating system. The miniport adapter 22 delivers the audio data stream to the RTP (real-time transport protocol) intermediate bridge driver 24 of the invention. The RTP bridge 24 provides end-to-end network transport functions for applications transmitting real-time data, such as the telephone audio data stream, over multicast or unicast network services. The data transport is, conventionally, augmented by a control protocol (RTCP) to allow monitoring of the data delivery in a manner scalable to large multicast networks, and to provide minimal control and identification functionality. RTP and RTCP are designed to be independent of the underlying transport and network layers. The RTP protocol supports the use of RTP-level translators and mixers. This RTP intermediate protocol driver interface lies between legacy protocol adapter or driver 22 and the upper level transport protocol adapter or driver 26 which driver implements a Transport Driver Interface TDI interface or another application-specific interface to provide services to its users. Such a driver allocates packets, copies data into the packets and sends the packets to the lower level driver by calling the NDIS. It also provides a protocol interface at its lower level to receive packets from the next lower level driver or adapter 24.

The intermediate, high-performance network RTP bridge device driver 24 is located immediately above the network interface driver 22 in the network stack and processes every network packet that is received. This processing consists of passing each received audio data packet up to the next higher IP protocol adapter driver 26 in the network stack, and inspecting each packet to determine if it is an RTP packet whose destination port is listed in a the redirection table 30 at the RTP level, which redirection table is set up by the call manager program in order to inform the RTP bridge of the stream's original destination, as discussed hereinbelow in detail. A call coming in has the media server as its destination, so the RTP bridge must redirect the call to its actual, intended destination. Those packets which meet this latter criterion are duplicated, and then overwritten with respect to source and destination IP addresses and ports—these values being read from the same redirection table entry that contained the destination port. The duplicated packet is then passed back to the network driver 22 to be transmitted. The delay introduced from reception to retransmission is less than 1 mS. The audio stream 0 (block 32 of FIG. 2) and the destination audio stream 1 (block 34 of FIG. 2) sent from the kernel-mode RTP bridge driver are then input into the user-mode recording application 34', and thereafter encoded by an encoder 36 and stored in local storage medium 38 of the respective media server 12, for subsequent storage in network storage device or file server 14, if desired or required.

It is noted that the above-described packet reflection procedure is CODEC (coder-decoder) independent. At the application level, the packets to be recorded are independently decoded, whereby the bi-directional media streams 32, 34 utilizing asymmetric codes are supported. The two streams 32, 34 are summed to create a single recording of both sources in the call. The summed stream is converted to a common format for storage and playback, such as 8 KHz, 8-bit sampled, u-law wav file. Since the real time reflection of the stream is handled below the IP stack, the application layer utilizes the IP stack buffering while performing the decoding, summing, recoding and transfer to recording-storage operations. Information regarding the call recording is stored as an extension to the CDR (Call Detail Record). Therefore, recordings are searchable by all CDR attributes such as Caller ID (CLID) or Automatic Number Identification (ANI); Dialed Number Identification Service (DNIS). CDR reports can provide an indication that there is a recording available for a call.

Figure 4B:
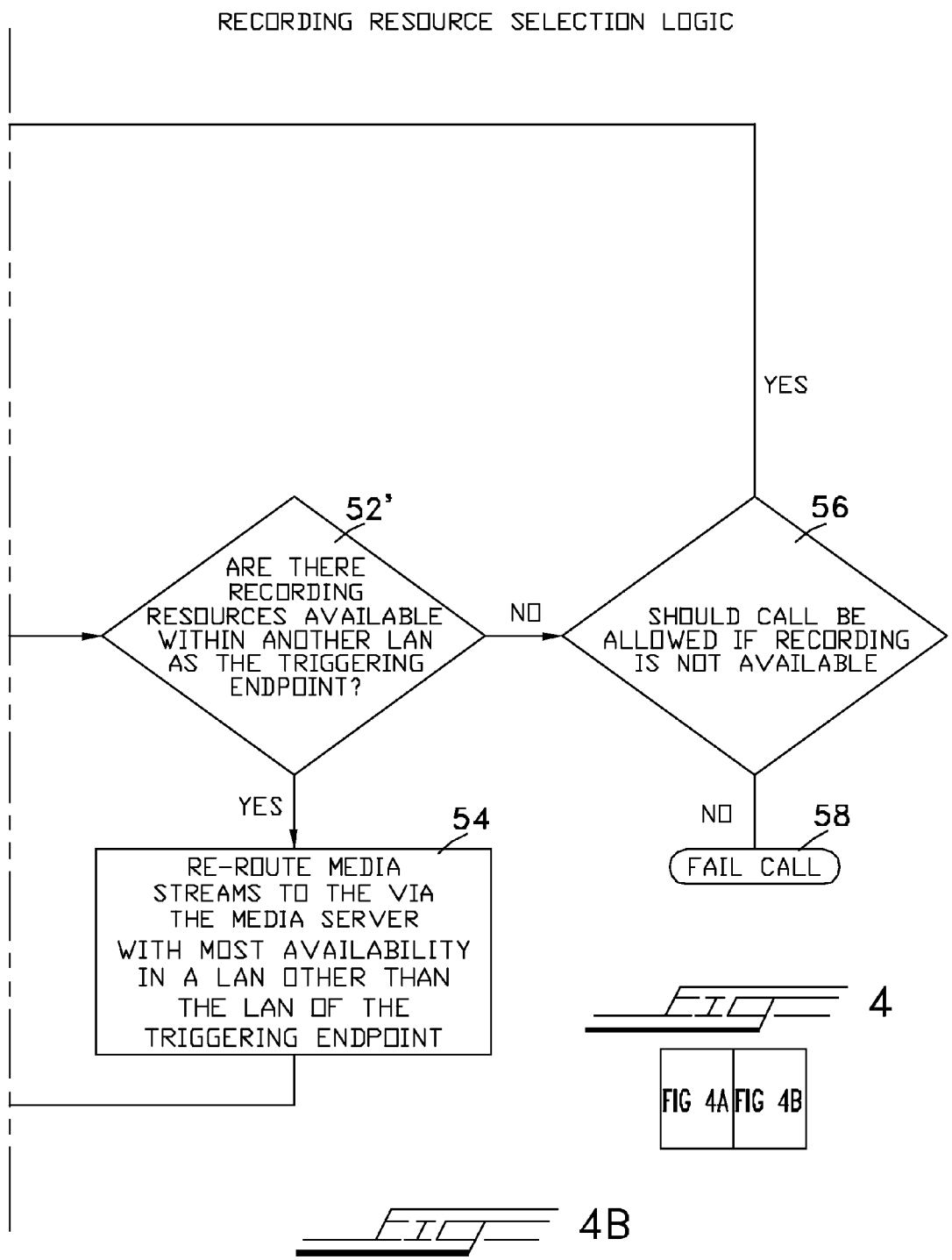

Referring now to FIG. 4, the recording resources selection logic is shown. Once a call is initiated (block 40), the recording applications software 34 determines if the call is one that requires recording (block 42) as set either by the local end-user or workstation, or an administrator. If it is not a call to be recorded, then the audio data stream is set up as usual and the call completed in a normal manner (block 44). If the answer to decision block 42 is "YES", then the software determines if there are recording resources available on the respective managing host media server 12 associated with the source, (decision block 46). If "YES", then the subsequent audio streams 32, 34 (FIG. 2) are re-routed via this media server (block 48), with call setup accomplished (block 50), and with the audio data streams 32, 34 being recorded via the recording application at the host media server. If the answer to decision block 46 is "NO", then the software of the invention looks for other media servers 12 on the same LAN as that of the triggering end-user to see if they have recording resources available (decision block 50'). If YES", then the audio streams 32, 34 are re-routed to the one thereof having the most availability (block 52). If the answer to decision block 50' is "NO", then the system software looks to recording resources availability at media servers of another LAN not associated with the triggering end-point (decision block 52'). If "YES", then the audio streams 32, 34 are re-routed to the one thereof having the most availability (block 54), with the call setup completed (block 50). If the answer to decision block 52' is "NO", then the application software determines in decision block 56 if the call should allowed to be completed without the recording thereof. If "YES", the call setup is completed (block 44). If "NO", then a "failed" call signal is sent back to the triggering or source end-user (block 58).

Figure 5:
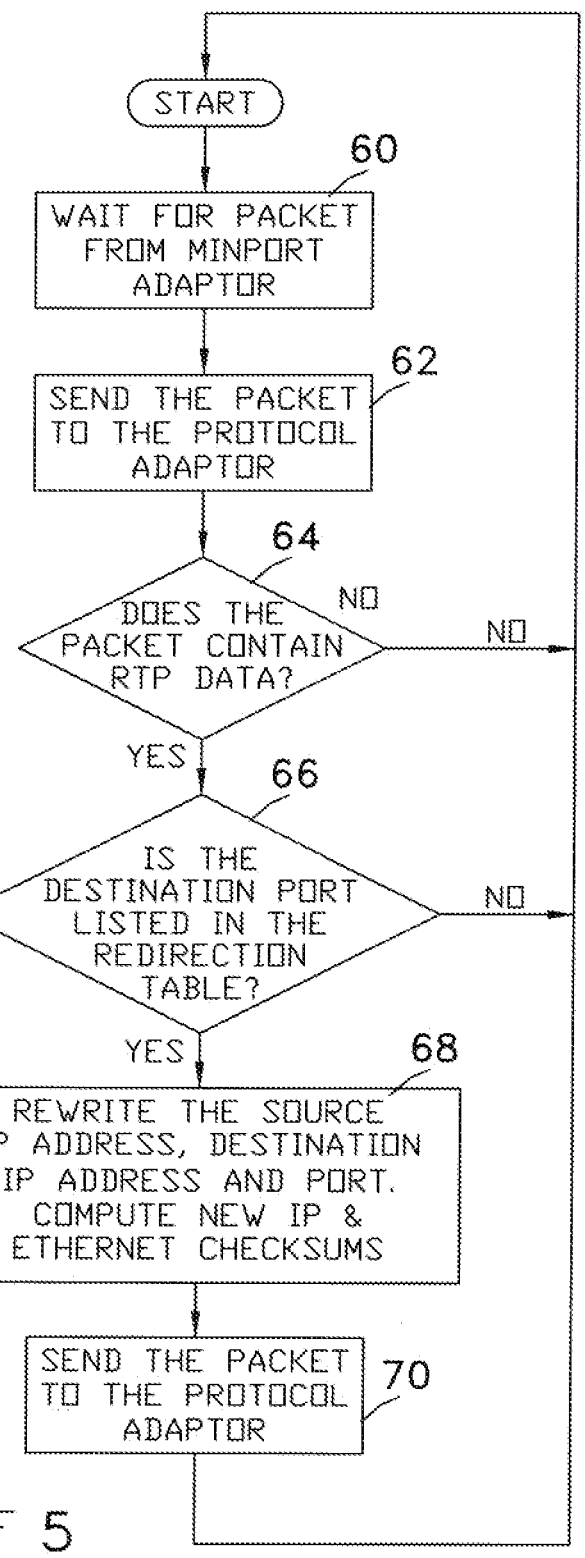
FIG. 5 is a flow chart of the RTP bridge intermediate of FIG. 4.

Referring to FIG. 5, there is shown the flow chart for the intermediate RTP bridge driver 24 of FIGS. 2 and 3. The RTP bridge driver waits for audio packets from the protocol adapter 22 of FIGS. 2 and 3 (block 60), whereupon receipt thereof, it sends the packets to the upper-level IP protocol adapter 26 of FIGS. 2 and 3 (block 62), where it is decided in decision block 64 if the packets contain RTP data. If the answer to decision block 64 is "NO", then nothing is done. If the packets are RTP data, then decision block 66 determines if the destination port is listed in re-direction table 30 of FIG. 2. If not, then nothing is done, since the call would not be able to be recorded. If "YES", then the source IP address, destination IP address and port are re-written, new IP and Ethernet checksums are computed (block 68), whereupon the modified packet is sent to the miniport adapter 22 of FIGS. 2 and 3 (block 70).

Figure 6:
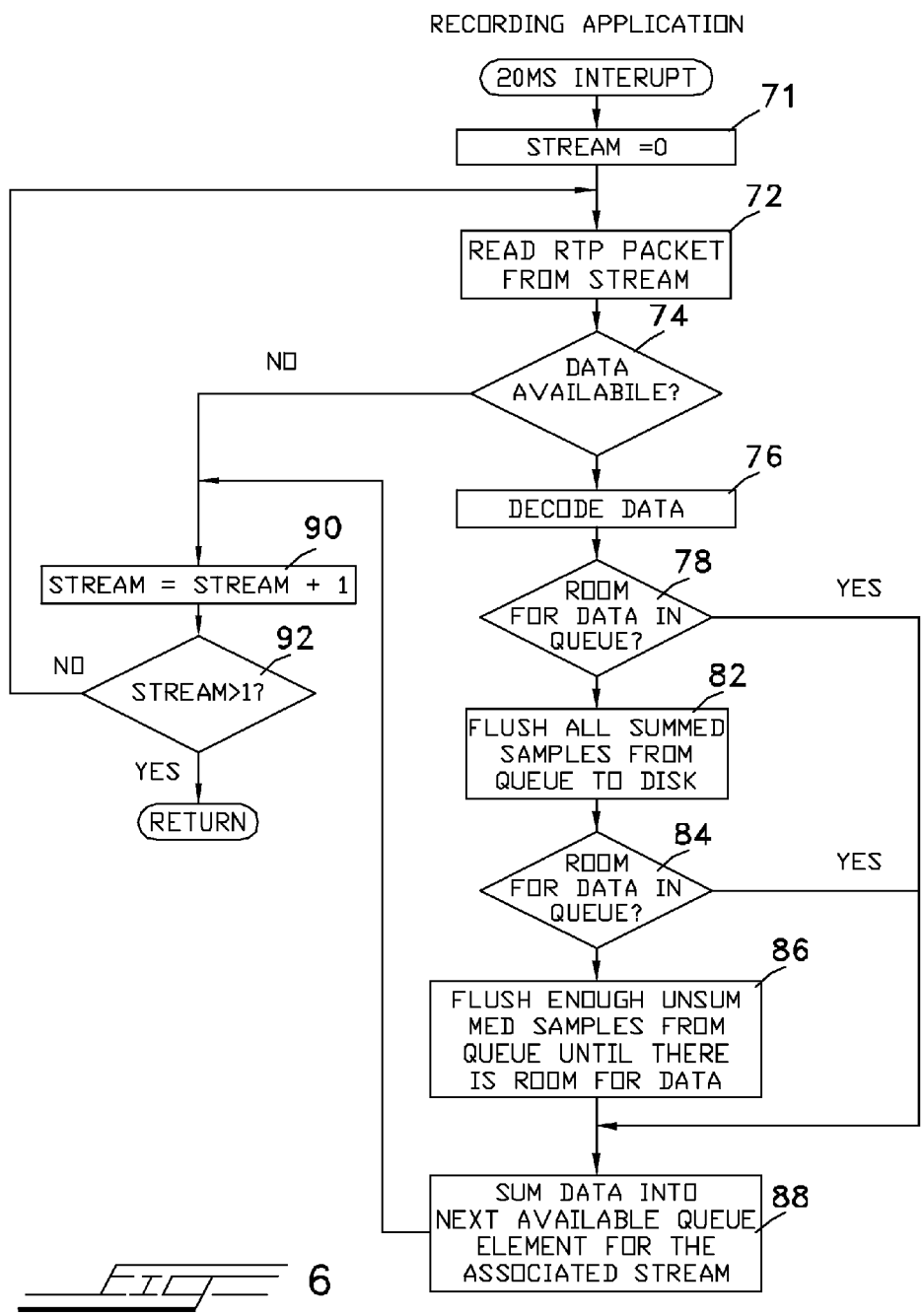
FIG. 6 is a flow chart of the software recoding application of FIG. 4.

Referring now to FIG. 6, there is shown the flow chart for the recording applications software. In order to create a recording of a conversation between two end-points, the voice from both sources (Stream 0 and Stream 1) must be captured and mixed together. A packet queue of depth 8 is created to sum, or mix, together the packets of the streams. Every 20 mS, which is the nominal audio packetization period, the software application of the invention attempts to read a RTP packet and sum it into that stream's next available element of the queue for the stream. This is done once for each of the streams per 20 mS interrupt. The stream is initialized to Stream 0 (32, block 71). The RTP packet from an audio stream 32, 34 is read (block 72). Decision block 74 decides if there is any audio data to read; owing to network jitter and possible packet loss, there may be no data or more than one packet of data available to be processed. If "YES", then the software decodes the data (block 76) and then determines if there is room for the data in the queue (decision block 78). Many codecs can be used to transport RTP. The RTP is decoded into a linear format before it is mixed, If the answer to decision block 78 is "YES", then the operation of summing is performed placing the data into the next available queue element. The use of a pointer for each Stream 0 and 1 allows the summation process to reconcile the effects of network jitter (block 88). If the answer to decision block 78 is "NO", then the software flushes all summed samples from the queue to disk (bock 82). A summed sample refers to a queue element that has had data from both Streams 0 and 1 summed into it. These elements are complete and can be moved from the queue and sent to the disk to free up space to sum more packets. The software then determines in decision block 84 if there is now room for the data in queue. If "YES", then the program proceeds to block 88 to sum the data into the next available queue element for the available stream, as described above. If the answer to decision block 84 is "NO, then the software flushes enough unsummed samples from the queue until there is room for data (block 86). Due to severe jitter or packet loss in the network, it is possible to exhaust the queue with only data from one of the Streams 0 and 1; in this case, an element containing only one stream's data will be moved from the queue and sent to the disk for storage. Then, the program proceeds to block 88, as described above.

The steps from blocks 78 through 88 are used to sum both audio streams 32, 34 (streams 0 and 1) into a buffer in order that the complete conversation is recorded, with both ends of the call recorded in sequence as it actually occurred, as described above. If the answer to decision block 74 is "NO", or after completing the sum-data step of block 88, the program then increments in block 90 from data Stream 0 to data Stream 1, if data Stream 0 had been processed. If data Stream 1 had been processed, then the software determines that the audio data stream is greater than one ("YES" to decision block 92), meaning the software will return and await data for stream 0 again. If the answer is "NO" to decision block 92, then the program awaits receipt of audio data for Stream 1 from the RTP bridge level. The queue consists of a buffer with 2 pointers, one pointer for each stream (STREAM 0 pointer and STREAM 1 pointer). The queue is initialized to silence and each sample flushed to disk is replaced with silence. As packets arrive for each system, they are summed into the next available location in the queue, resulting in either packets containing the sum of stream 0 and stream 1 or the data from a single system stream if the other stream is unavailable for a period of time (some stream data may not available due to packet loss or excessive jitter).

Referring to FIG. 7, there is shown the recording setup call flow managed by the call manager interacting with the recording application 34 of the invention stored at a media server 12. The call flow describes the signaling between the call manager, media server and the phones in order to manage and record a call in the unicast system of the invention. The call manager controls the call setup and population of the redirection table 30 at the RTP bridge driver level 24 (FIG. 2). The Media Server provides the duplication of the packets overwritten with respect to source and destination IP address and ports—these values being read from the same redirection table entry that contained the destination port. The duplicated packet is then passed back to the network driver 22 to be transmitted. In FIG. 7, the initial state is an established connection between phones A and B. The call manager initializes recording of the call via the respective media server, and then creates media connections consisting of media descriptions A and B, containing the IP addresses and Port that the end-point will be accepting the RTP stream. The media server responds to the call manager with the "Create Connection Result", which includes the media server descriptions of A and B, each of which includes the IP address and ports that the media server will be using to accept the RTP streams. The call manager, in turn, modifies the media connection's descriptions of A and B and triggers the media server to start the process of forwarding copies of, or duplicating, the voice packets to A and B for the RTP bridge. The media server then signals the call manager with the modified connection result of the media descriptions A and B. The call manager then modifies the media connection result for sending packets to phone A, which sends modified connection packets back to the call manager, followed by the same for the connection with phone B.

The redirection table 30 at the RTP bridge driver level 24 (FIG. 2) consists of 5 parameters per entry. Each entry is responsible for one unidirectional stream. Two entries are required to record both directions of a phone call:
Endpoint A--------->MediaServer-------->Endpoint B
Endpoint A<---------MediaServer<--------Endpoint B
The parameters of a table entry are as follows:

ListenPort—The UDP (user datagram protocol) Port the Media Server listens on for the incoming RTP stream to be processed;

SendPort—The UDP (user datagram protocol) Port the Media Server will use to transmit copied RTP packet from;

RedirectPort—The Port of the destination endpoint that the Media Server will send RTP to;

RedirectIPAddr—The IP Address of the destination endpoint that the Media Server will send RTP to;

RedirectMACAddr—MAC (media access control) address to redirect to (this may be the endpoint or the gateway if located on another subnet).

The redirection table parameters are obtained by the recording application of FIG. 6, and passed on to the RTP Bridge Driver as follows. RedirectPort and RedirectIPAddr are obtained by the recording application during call setup (see Recording Call Flow diagram of FIG. 7 discussed hereinabove). Recording application performs an ARP (address resolution protocol) to obtain the MAC (media access control) address to be used. The Recording Application opens the Listen and Send ports to be used. The Recording Application passes these parameters to the RTP Bridge driver to build the redirection table.

The application of the RTPBridge is not limited to the recording of audio RTP. The present invention may be used to record video RTP. It may be utilized for applications beyond recording. For example, it may also be used to construct an n-party conference broadcast application as diagrammed below:
Endpoint A--------->MediaServer-------->Endpoint B
Endpoint A--------->MediaServer-------->Endpoint C
Endpoint A--------->MediaServer-------->Endpoint D
Endpoint A--------->MediaServer-------->Endpoint n The present invention is not restricted to RTP traffic. It may be used for any application requiring the need to efficiently relay real time UDP traffic.

While a specific embodiment of the invention has been shown and described, it is to be understood that numerous changes and modifications may be made therein without departing from the scope and spirit of the invention as set forth in the appended claims.

What is claimed is:

1. A method of recording calls in an IP packet-based data network, which network includes a plurality of end-users and at least one media server used in connecting the end-users, said at least one media server having memory for storing software applications, said at least one media server comprising a protocol stack stored in said memory, said method comprising:
    (a) directing real-time data streams between end-users participating in a call to an intermediate real-time protocol driver interface of said at least one media server, and sending the real-time data streams to upper level protocol of said protocol stack, wherein said real-time data streams are unicast, bidirectional media streams of the end-users;
    (b) sending the real-time data streams to a call recording software program stored in the memory of the at least one media server;
    (c) storing the real-time data streams in memory of said at least one media sever using the call recording software program;
    (d) duplicating the real-time data streams using a software driver program having a redirection table;
    (e) rewriting source and destination IP addresses and ports of said real-time data streams as defined by said redirection table of said software driver program;
    (f) transmitting the real-time data streams of to the destination addresses and ports of said redirection table;
    (g) summing the real-time data streams of said end-users using the call recording software program and creating a single recording of each participant of the call;
    (h) storing information of the real-time data streams as an extension to the Call Detail Records using said memory;
    (i) searching the stored information of the real-time data streams by Call Detail Record attributes, wherein said Call Detail Record attributes include at least one of: Caller ID, Automatic Number Identification, and Dialed Number Identification Service.

2. The method of recording calls in an IP packet-based data network according to claim 1, wherein said IP packet-based data network comprises a plurality of media servers, said method further comprising:

(g) directing the data streams between end-users to an intermediate real-time protocol driver interface of another said media server, when said one media server is not capable of handling the data streams.

3. The method of recording calls in an IP packet-based data network according to claim 1, said method further comprising:
   (g) directing the data streams between end-users to an intermediate real-time protocol driver interface of a said media server of a different IP-based packet-data network, when said at least one media server is not capable of handling the data streams.

4. The method of recording calls in an IP packet-based data network according to claim 1, wherein said (e) further comprises rewriting the source and destination IP addresses and ports using a redirection table having the additional parameters of RedirectMACAddr.

5. The method of recording calls in an IP packet-based data network according to claim 1, wherein said data streams are at least one of: audio packet-data stream and video packet-data stream.

6. The method of recording calls in an IP packet-based data network according to claim 1, wherein said real-time protocol driver interface comprises a RTP bridge device driver.

* * * * *